(12) United States Patent  
Aoki et al.

(10) Patent No.: US 8,105,528 B2  
(45) Date of Patent: Jan. 31, 2012

(54) AUTOMOTIVE FUEL TANK FABRICATION APPARATUS

(75) Inventors: Tomohide Aoki, Aichi-ken (JP); Yoshinari Yoshida, Aichi-ken (JP)

(73) Assignee: FTS Co., Ltd., Aichi-ken (JP)

( * ) Notice: Subject to any disclaimer, the term of this patent is extended or adjusted under 35 U.S.C. 154(b) by 374 days.

(21) Appl. No.: 12/314,343

(22) Filed: Dec. 9, 2008

(65) Prior Publication Data

US 2009/0162472 A1    Jun. 25, 2009

(30) Foreign Application Priority Data

Dec. 21, 2007   (JP) ................... 2007-329746

(51) Int. Cl.
*B29C 49/04* (2006.01)
*B29C 49/20* (2006.01)

(52) U.S. Cl. ........ 264/515; 264/516; 425/503; 425/522; 425/532

(58) Field of Classification Search .......... 425/503, 425/522, 532; 264/515, 516
See application file for complete search history.

(56) References Cited

U.S. PATENT DOCUMENTS

| | | | |
|---|---|---|---|
| 3,954,369 A * | 5/1976 | Kormendi | 425/532 |
| 4,719,072 A * | 1/1988 | Kojima et al. | 264/515 |
| 5,326,514 A | 7/1994 | Linden et al. | |
| 7,455,190 B2 * | 11/2008 | Potter et al. | 220/4.14 |
| 2001/0009703 A1 * | 7/2001 | Toshikawa | 428/35.7 |

FOREIGN PATENT DOCUMENTS

| | | | |
|---|---|---|---|
| JP | 55021207 A | * | 2/1980 |
| JP | 55025380 A | * | 2/1980 |
| JP | A-01-301227 | | 12/1989 |
| JP | A-06-143396 | | 5/1994 |
| JP | 11270908 A | * | 10/1999 |

* cited by examiner

*Primary Examiner* — Robert B Davis (74) *Attorney, Agent, or Firm* — Posz Law Group, PLC (57) ABSTRACT

An automotive fuel tank fabrication apparatus is provided. The automotive fuel tank has a blow mold and a built-in part holding unit. The built-in part holding unit includes a plurality of holding rods for holding a built-in part. The holding rods are made to freely advance and retreat in such a manner as to hold the built-in part in a position where the built-in part confronts cavities when the blow mold is opened and to retreat from the blow mold when the blow mold is closed with the built-in part left positioned in an interior of a parison. The holding rods are formed in such a manner that their diameters are reduced as they extend towards distal ends thereof and are inserted into insertion holes formed in the built-in part so as to hold the built-in part.

4 Claims, 7 Drawing Sheets

AUTOMOTIVE FUEL TANK FABRICATION APPARATUS

BACKGROUND OF THE INVENTION

1. Field of the Invention

The present invention relates to a fabrication apparatus for an automotive fuel tank which is made from a thermoplastic synthetic resin and more particularly to a fabrication apparatus for an automotive fuel tank whose outer wall is formed from a thermoplastic synthetic resin through blow molding and which has a built-in part in an interior thereof 2. Related Art Conventionally, metallic fuel tanks were used as fuel tanks for motor vehicles and the like. In recent years, however, fuel tanks made from thermoplastic synthetic resins have been in use due to thermoplastic resin materials being light in weight to satisfy increasing demands for vehicles which are light in weight, being free from rust, being easy to be molded into desired shapes.

A blow molding approach has been used in many cases in fabricating automotive fuel tanks from thermoplastic resins because the blow molding approach facilitates the molding of hollow objects. In the blow molding approach, a parison made of a molten thermoplastic synthetic resin member is extruded into a cylindrical shape from above, and air is blown into the parison while the parison is being held by molds to thereby fabricate an automotive fuel tank.

On the other hand, also in the blow molding approach, it is required to provide built-in parts such as valves and baffle plates for suppressing flowing or lapping noise of fuel in an interior of a fuel tank.

Then, to make this happen, there has been proposed an approach in which a built-in part 120 is set in a resin frame, and the resin frame is set within a mold, so that the built-in part 120 is made to be secured to an inner circumferential surface of an outer wall of a fuel tank through blow molding, whereby the built-in part 120 is mounted in an interior of the fuel tank (for example, refer to JP-A-1-301227).

In this case, however, since the built-in part 120 is set in the resin frame and is then secured to the inner circumferential surface of the outer wall of the fuel tank, labor hours have to be involved in cutting to remove the resin frame after the fuel tank has been molded, and with a small built-in part 120, a large resin frame has to be used, often resulting in a case where the weight of the molded fuel tank is increased.

Figure 11:
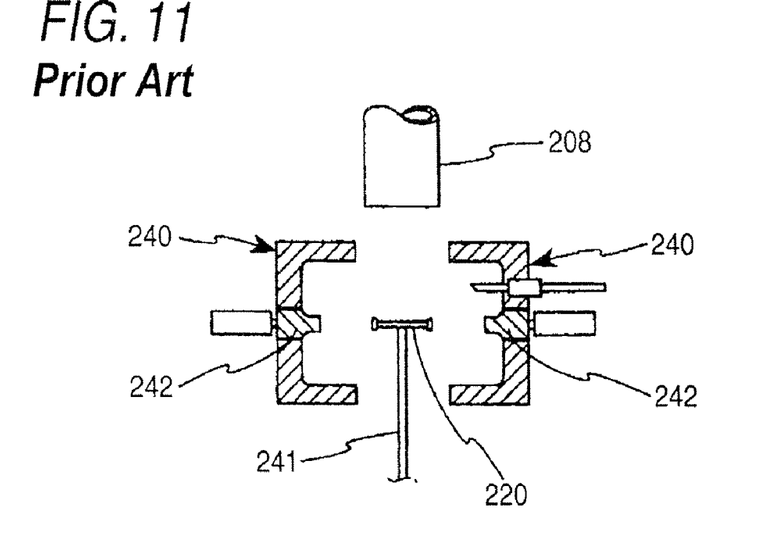
FIG. 11 is a sectional view showing a conventional fuel tank fabrication apparatus in which a blow mold is opened.
Figure 12:
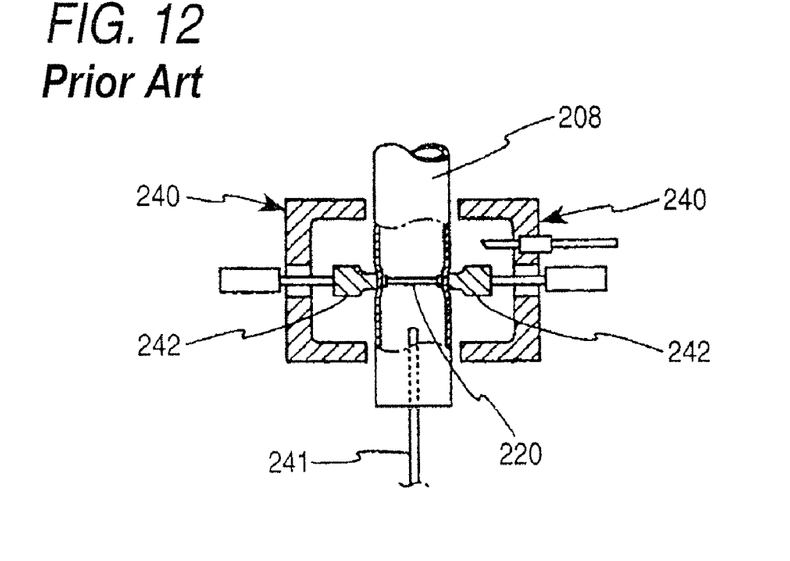
FIG. 12 is a sectional view showing the conventional fuel tank fabrication apparatus in which press pins of the blow mold are caused to slide.

Then, to cope with this, a fabrication apparatus as is shown in FIGS. 11 to 12 is used in placing a built-in part in an interior of a fuel tank (for example, refer to JP-A-6-143396 and U.S. Pat. No. 5,326,514).

In this apparatus, firstly, as is shown in FIG. 11, a built-in part 220 is placed on a holding rod 241 of a built-in part holding unit before a parison 208 is set in a blow mold 240, and then, the blow mold 240 is opened to position the built-in part 220 in an interior of the blow mold 240. Thereafter, with the blow mold 240 left open, the parison 208 is lowered, so as to position the built-in part 220 in an interior of the parison 208.

As is shown in FIG. 12, thereafter, press pins 242 are made to project inwards from both sides of the blow mold 240 before the blow mold 240 is closed to press against the parison 208, so as to press the parison 208 to side ends of the built-in part 220. As this occurs, since an inner surface of the parison 208 has not yet been set then, the parison 208 and the side ends of the built-in part 220 can be fused together.

Then, the holding rod 241 of the built-in part holding unit is lowered, the blow mold 240 is closed, and air is blown into the parison 208 for blow molding.

In this fabrication apparatus, since the construction of the built-in part 220 is simple, the built-in part 220 is simply placed on the holding rod 241. However, in the event that a built-in part has a complex shape as with a built-in part 220 of a fuel tank, the built-in part 220 has to be held in a predetermined position in an ensured fashion. In addition, with a soft built-in part 220, there has been a situation in which part of the built-in part 220 hangs due to its own weight.

SUMMARY OF THE INVENTION

The invention has been made to cope with the situation described above, and an object thereof is to provide an automotive fuel tank fabrication apparatus for use in fabrication of a fuel tank incorporating a built-in part therein in which the built-in part can be held in a predetermined position in an interior of an automotive fuel tank in an ensured fashion.

With a view to attaining the object, according to a first aspect of the invention, there is provided an automotive fuel tank fabrication apparatus for forming through blow molding an automotive fuel tank having a built-in part mounted in an interior thereof and an outer wall formed from a thermoplastic synthetic resin, the automotive fuel tank fabrication apparatus comprising:

a blow mold for molding an outer wall of the automotive fuel tank; and a built-in part holding unit for holding the built-in part at an opening and closing portion of the blow mold so as to mount the built-in part within the automotive fuel tank, wherein the blow mold has two molds that can be opened and closed, and cavities are formed on opening and closing sides of the molds for molding the automotive fuel tank, so as to hold a parison therebetween to mold an outer wall of the automotive fuel tank, and wherein the built-in part holding unit includes a plurality of holding rods for holding the built-in part, the holding rods being made to freely advance and retreat so as to hold the built-in part in a position where the built-in part confronts the cavities on the opening and closing sides of the blow mold when the blow mold is opened, to position the built-in part in an interior of the parison when the blow mold is closed and to retreat from the blow mold after the parison is held, the holding rods being formed in such a manner as to reduce their diameters as they extend towards distal ends thereof and adapted to be inserted into insertion holes formed in the built-in part so as to hold the built-in part.

In the first aspect of the invention, the automotive fuel tank fabrication apparatus has the blow mold for molding an outer wall of the automotive fuel tank and the built-in part holding unit for holding the built-in part at the opening and closing portion of the blow mold so as to mount the built-in part within the automotive fuel tank. Because of this, in blow molding, the built-in part can be mounted in a predetermined position within the interior of the parison which forms the outer wall of the fuel tank.

The blow mold has the two molds that can be opened and closed, and the cavities are formed on the opening and closing sides of the molds for molding the automotive fuel tank, so as to hold the parison therebetween to mold the outer wall of the automotive fuel tank. Because of this, the parison can be held by the cavity portions of blow mold in such a manner as to be swollen into a desired shape to mold the automotive fuel tank.

The built-in part holding unit includes the plurality of holding rods for holding the built-in part and the holding rods are made to hold the built-in part in the position where the built-in part confronts the cavities on the opening and closing sides of the blow mold when the blow mold is opened. Because of this, there is caused no situation in which the built-in part moves in a rotational direction relative to the holding rods, and the built-in part can be positioned in the rotational direction and a horizontal direction relative to the cavities in an ensured fashion, whereby the built-in part can be mounted in a predetermined position with respect to the rotational direction and the horizontal direction in the interior of the automotive fuel tank. Since the built-in part holding apparatus has the plurality of holding rods, a large built-in part can be mounted without any deformation of the built-in part.

The holding rods are made to freely advance and retreat in such a manner as to advance to position the built-in part in then interior of the parison when the blow mold is closed and to retreat from the blow mold after the parison is held. Because of this, when the blow mold is opened, the built-in part can be held in the position where it confronts the cavities of the blow mold, and after the built-in part has been mounted in the interior of the parison which is held by the molds of the blow mold, the opening of the parison can be closed in an ensured fashion.

The holding rods are formed in such a manner as to reduce their diameters as they extend towards the distal ends thereof and adapted to be inserted into insertion the holes formed in the built-in part so as to hold the built-in part. Because of this, by determining the size of the insertion holes formed in the built-in part, the built-in part can be held in a predetermined position in a vertical direction of the holding rods, whereby the built-in part can be mounted in a predetermined position in a vertical direction in the interior of the fuel tank.

According to a second aspect of the invention, there is provided an automotive fuel tank fabrication apparatus as set forth in the first aspect of the invention, wherein the holding rods each have formed thereon a plurality of steps in such a manner that their diameters are gradually reduced as they extend towards the distal ends thereof, so as to lock the built-in part by the steps so formed.

In the second aspect of the invention, the holding rods each have formed thereon the plurality of steps in such a manner that their diameters are gradually reduced as they extend towards the distal ends thereof, so as to lock the built-in part by the steps so formed. Because of this, a plurality of portions of the built-in part can be held respectively by the plurality of steps of the single holding rod in an ensured fashion, whereby respective portions of a soft built-in part or a large built-in part can be held in predetermined positions in the interior of the fuel tank in an ensured fashion.

According to a third aspect of the invention, there is provided an automotive fuel tank fabrication apparatus as set forth in the first or second aspect of the invention, wherein the holding rods each have a circular or oval cross section.

In the third aspect of the invention, the holding rods each have the circular or oval cross section. Because of this, the positioning of the holding rods to the insertion holes is facilitated, and hence, the holding rods can easily be inserted into the insertion holes formed in the built-in part.

According to a fourth aspect of the invention, there is provided an automotive fuel tank fabrication apparatus as set in any of the first to third aspect of the invention, wherein the blow mold has formed thereon a slidable press pin for pressing a distal end portion of the built-in part from an outside of the parison for holding the built-in part.

In the fourth aspect of the invention, the blow mold has formed thereon the slidable press pin for pressing the distal end portion of the built-in part from the outside of the parison for holding the built-in part. Because of this, the built-in part can be fixed in place in the interior of the parison, and when molding the outer wall of the fuel tank by causing the parison to be swollen, there is caused no such a situation that the built-in part becomes out of position. In addition, the holding rods can be removed from the blow mold before the parison is caused to be swollen, and hence, there is caused no such situation that unnecessary openings are formed in the fuel tank.

According to a fifth aspect of the invention, there is provided an automotive fuel tank fabrication apparatus as set forth in any of the first to fourth aspects of the invention, wherein the parison which makes up the outer wall of the fuel tank is made up of five layers including an exterior main layer, an exterior adhesive layer, a barrier layer, an interior adhesive layer and an interior main layer in that order from the outside, the exterior main layer and the interior main layer being formed from a high-density polyethylene (HDPE), the barrier layer being formed from an ethylene-vinyl alcohol copolymer (EVOH), the exterior adhesive layer and the interior adhesive layer being formed from a synthetic resin having adhesion to both the high-density polyethylene (HDPE) and the barrier layer, and the parison is blow molded.

In the fifth aspect of the invention, in the parison which makes up the outer wall of the fuel tank, the exterior main layer and the interior main layer are formed from the high-density polyethylene (HDPE). Because of this, the outside of the fuel tank has sufficient rigidity and impact resistance, and even in the event that fuel soaks into the interior main layer, the rigidity of the fuel tank is ensured, thereby making it possible to increase the impact resistance.

The barrier layer is formed from the ethylene-vinyl alcohol copolymer (EVOH). Because of this, the barrier layer has superior impermeability against gasoline and can be fusion molded, exhibiting superior workability. In addition, the barrier layer still has the superior impermeability against gasoline which contains alcohol under a highly humid condition. The exterior adhesive layer and the interior adhesive layer are formed from the synthetic resin having adhesion to both the high-density polyethylene (HDPE) and the barrier layer, and because of this, the exterior adhesive layer and the interior adhesive layer strongly adhere respectively to the barrier layer, and the exterior main layer and the interior main layer so as to establish strong adhesion between the respective layers of the fuel tank for integration, whereby the fabrication apparatus for the fuel tank having the fuel impermeability and strength can be realized.

Since the built-in part holding unit includes the plurality of holding rods for holding the built-in part, there is caused no such situation that the built-in part moves in the rotational direction relative to the holding rods, and the built-in part can be positioned in the rotational direction and the horizontal direction relative to the cavities in the ensured fashion. Since the built-in part holding apparatus has the plurality of holding rods, the large built-in part can be mounted without any deformation of the built-in part.

Since the holding rods are made to freely advance and retreat, after the built-in part has been mounted in the interior of the parison which is held by the molds of the blow mold, the opening of the parison can be closed in an ensured fashion.

Since the holding rods are formed in such a manner as to reduce their diameters as they extend towards the distal ends thereof, by determining the size of the insertion holes formed in the built-in part, the built-in part can be held in the predetermined position in the vertical direction of the holding rods, whereby the built-in part can be mounted in the predetermined position in the vertical direction in the interior of the fuel tank.

DETAILED DESCRIPTION OF THE PREFERRED EMBODIMENTS

Figure 1:
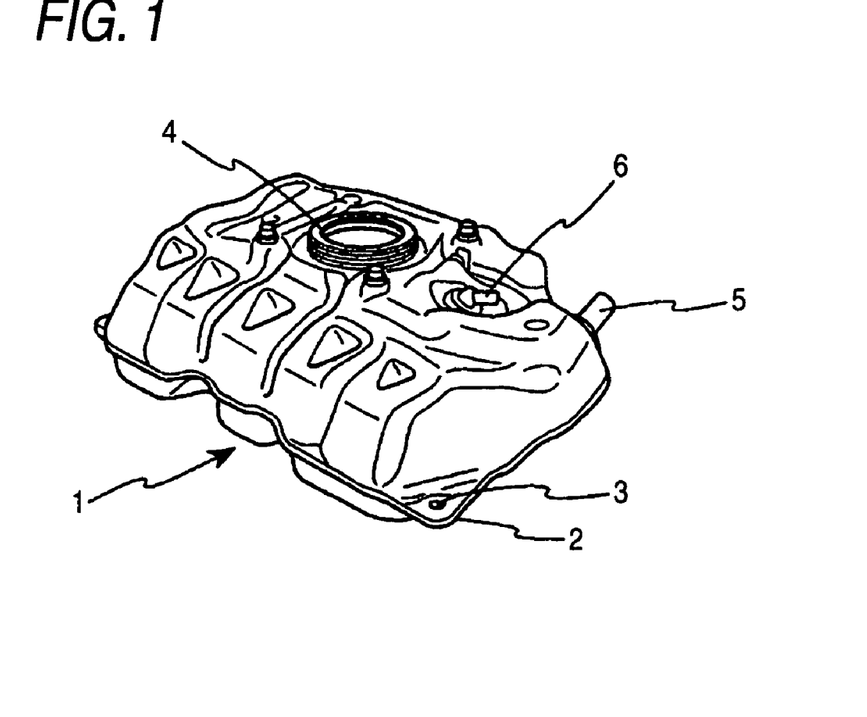
FIG. 1 is a perspective view of a fuel tank according to an embodiment of the invention.
Figure 2:
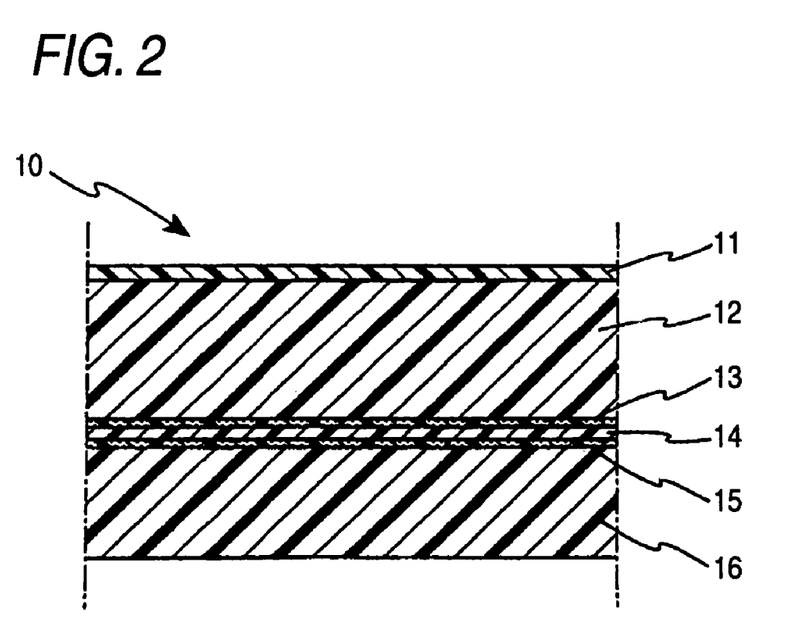
FIG. 2 is a partial enlarged sectional view showing the construction of an outer wall of the fuel tank of the invention.

An automotive fuel tank 1 of an embodiment of the invention will be described based on FIGS. 1 to 10. FIG. 1 is a perspective view of a fuel tank 1 of an embodiment of the invention, and FIG. 2 is a partial sectional view of an outer wall 10 of the fuel tank 1 which is made from a thermoplastic synthetic resin.

Figure 3:
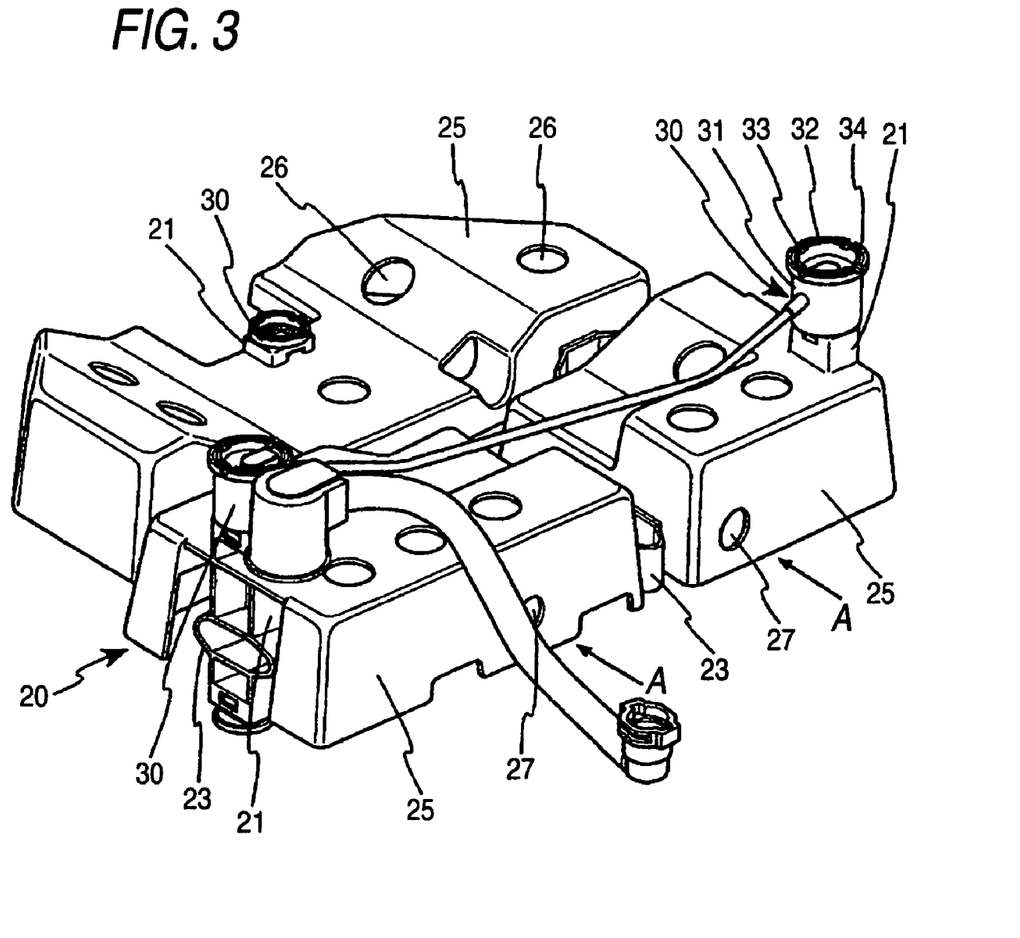
FIG. 3 is a perspective view of a built-in part which is mounted in an interior of the fuel tank of the invention.
Figure 4:
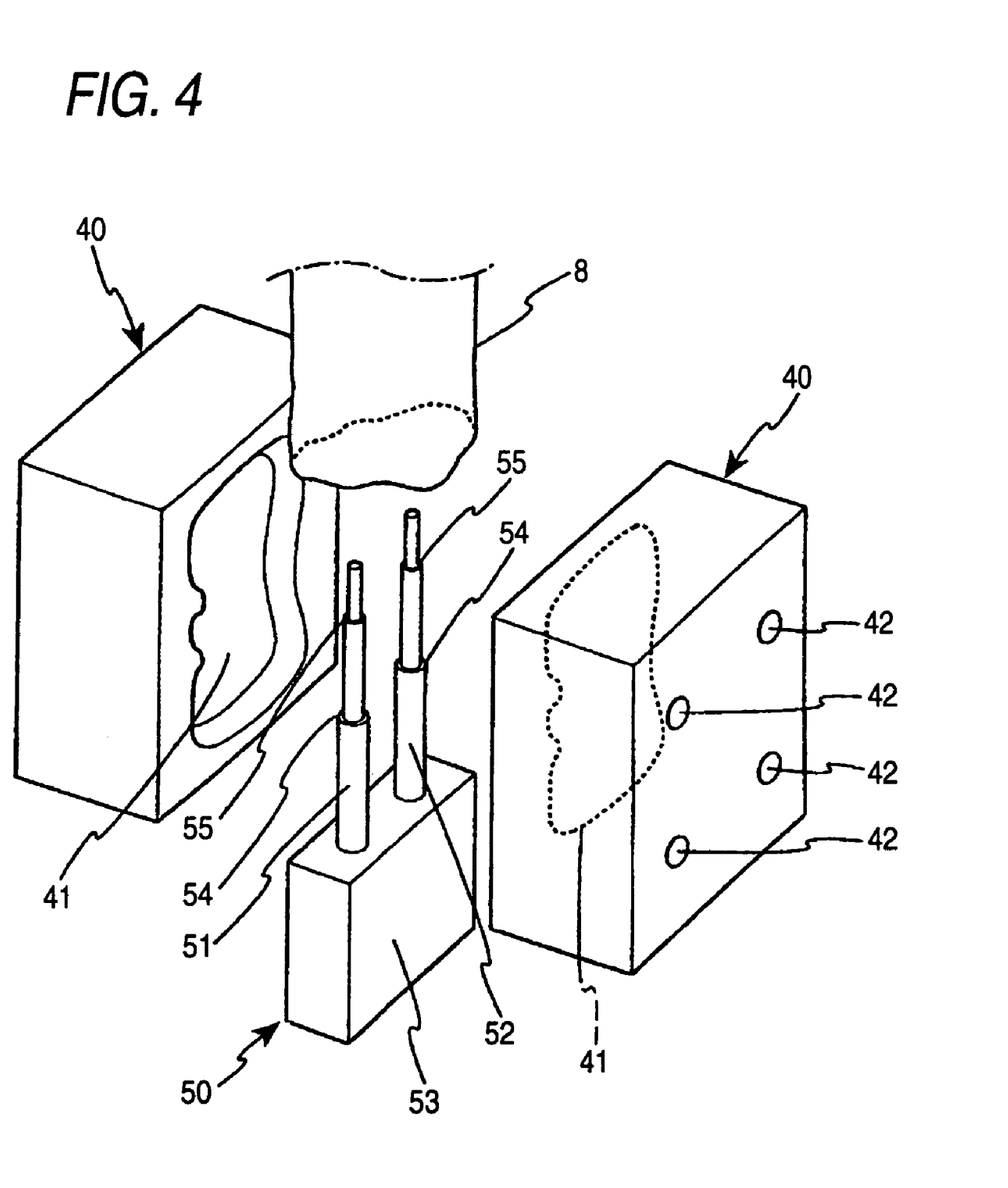
FIG. 4 is a perspective view of a fabrication of the fuel tank of the invention.

FIG. 3 is a perspective view showing a built-in part 20 which is mounted in an interior of the automotive fuel tank 1 which is used in the embodiment of the invention, and FIG. 4 is a perspective view of a fabrication apparatus of the automotive fuel tank 1 of the invention.

FIGS. 5 to 10 are drawings showing steps of blow molding the fuel tank 1.

As is show in FIG. 1, the fuel tank 1 which is fabricated in the embodiment of the invention has a pump unit mounting hole 4 formed in an upper surface of the tank for ingress and egress of a fuel pump (not shown) into and from the fuel tank 1. In addition, a fuel inlet hole 5 into which fuel is supplied from an inlet pipe (not shown) is formed in a side surface or the upper surface of the fuel tank 1.

In addition, an outer circumferential rib 2 is formed around a full circumference of the fuel tank 1, and mounting holes 3 are formed in the outer circumferential rib 2 in several predetermined locations such as in corners thereof, whereby the mounting holes 3 and a vehicle body are fastened together with bolts so that the fuel tank 1 is mounted on the vehicle body.

Furthermore, a mounting hole 6 is formed at a portion on the upper side of the fuel tank 1 and a hose for collecting evaporated fuel in an interior of the fuel tank 1 is connected to the mounting hole 6 so formed.

Although the fuel tank 1 which is fabricated in this embodiment is fabricated by a blow molding fabrication apparatus which will be described later, an outer wall of the fuel tank 1 is formed through blow molding, and as is shown in FIG. 2, the outer wall 10 is made up of a skin layer 11, an exterior main layer 12, an exterior adhesive layer 13, a barrier layer 14, an interior adhesive layer 15 and an interior main layer 16 in that order from an outside thereof. The configuration of the outer wall 10 will be described later.

For example, a built-in part 20 as shown in FIG. 3 is mounted in an interior of the fuel tank 1. A mounting method of the built-in part 20 will be described.

Firstly, based on FIG. 3, a built-in part 20 according to a first embodiment will be described. The built-in part 20 is formed by connecting together a plurality of box-shaped objects 25. The box-shaped objects 25 each have a space in an interior thereof, and a plurality of holes 26 are formed in respective portions of the respective box-shaped objects 25. Because of this, fuel oil within the fuel tank 1 can freely ingress and egress the box-shaped objects 25, and the lapping of the fuel oil within the fuel tank 1 is prevented, so as to prevent the generation of lapping noise. Furthermore, a fuel pump, a canister and the like can be mounted in the box-shaped objects 25.

In addition, insertion holes 27 are formed in side surfaces of the box-shaped objects 25, and as will be described later, a first holding rod 51 and a second holding rod 52 are inserted into the insertion holes 27 so formed. In FIG. 3, although the insertion holes 27 are formed on right-hand side surfaces of the two box-shaped objects 25 which lie on a near side of the drawing, insertion holes 27 are also formed in side surfaces of the box-shaped objects 25 which lie on a far side of the drawing. In addition, the first holding rod 51 and the second holding rod 52 are inserted into the insertion holes 27 from a direction indicated by arrows A in FIG. 3.

A pillar member 21 is formed in each of the box-shaped objects 25 in such a manner as to be brought into abutment with an upper side and a lower side of the outer wall 10 of the fuel tank 1. Because of this, the box-shaped objects 25 can be mounted in predetermined positions within the fuel tank 1 by the pillar members 21. Furthermore, the outer wall 10 is supported on the upper side and the lower side thereof by the pillar members 21, so as to increase the strength of the fuel tank 1, and the contraction and expansion of the fuel tank 1 can be restricted by the pillar members 21. Mounting members 30 are attached to distal ends of the pillar members 21.

The pillar members 21 are mounted in predetermined positions in the interior of the fuel tank 1, and as will be described later, by the mounting members 30 being fusion bonded to inner surfaces of the outer wall 10 of the fuel tank 1 on the upper side and the lower side thereof, the pillar members 21 are mounted within the fuel tank 1, so as to hold a plurality of portions on the upper side and the lower side of the outer wall 10 of the fuel tank 1. Because of this, not only can the strength of the outer wall 10 of the fuel tank 1 be increased, but also the contraction and expansion of the fuel tank can be prevented, and additionally, the strength can be maintained against impact.

A dimension change absorbing member 23 is formed in each of the pillar members 21. In addition, a dimension change absorbing member 23 is also formed in each of connecting portions at which the box-shaped objects 25 are connected together. The box-shaped objects 25 may be connected together by the dimension change absorbing members 23. Alternatively, the box-shaped objects 25 may be connected together by beam members, and the dimension change absorbing members 23 may be formed in the beam members.

Since the dimension change absorbing members 23 are formed in the pillar members 21, even in the event that fuel tank 1 or the box-shaped objects 25 expand or contract, the dimension change absorbing members 23 attached to the pillar members 21 deflect to prevent the separation of the pillar members 21 from the outer wall 10 of the fuel tank 1, thereby making it possible to maintain the strength of the fuel tank 1. In addition, impact applied to the fuel tank 1 can be absorbed by the dimension change absorbing members 23.

Horizontal contraction and expansion of the fuel tank 1 or the box-shaped objects 25 can be absorbed by the dimension change absorbing members 23 which are formed at the connecting portions which connect together the box-shaped objects 25, whereby the positions of the box-shaped objects 25 within the fuel tank 1 can be maintained.

In addition, baffle plates 24, valves which are connected to various types of hoses and a sub-tank which is provided in the interior of the fuel tank 1 can be provided in the box-shaped objects 25. In place of the box-shaped objects 25, beam members which connect together the pillar members 21 in the horizontal direction can be used.

Furthermore, dimension change absorbing members 23 can be formed in part of the beam members to deal with the contraction or expansion of the outer wall 10 of the fuel tank 1.

The built-in part 20 can be formed from a thermoplastic synthetic resin having a fuel oil resistance such as polyacetal, high-density polyethylene (HDPE) and the like, whereby not only can the strength of the fuel tank 1 be increased, but also even in the event that the built-in part 20 is mounted in the interior of the fuel tank 1, there is caused no such situation that the rigidity thereof is reduced due to swelling by the fuel oil.

The mounting members 30 are attached to the distal ends of the pillar members 21. As is shown in FIG. 3, the mounting members 30 are formed into a circular cylindrical shape or quadrangular cylindrical shape on some occasions and are formed into a flat shape on other occasions.

The mounting member is made up of a connecting portion 31 which connects or continues to the built-in part 20 and an abutment portion 32 which is brought into abutment with the inner surface of the outer wall 10 of the fuel tank 1.

In this embodiment, the connecting portion 31 is formed into a circular cylindrical shape and is made hollow inside. A locking portion is formed at a lower end of the connecting portion 31, so that a claw of the locking portion is brought into engagement with a distal end of the pillar member 21 when the connecting portion 31 is fitted in the distal end of the pillar member 21, whereby the mounting member 30 is strongly attached to the inner surface of the outer wall 10 of the fuel tank 1.

With the mounting member 30 which is formed into the flat shape, the connecting portion 31 is made up of a projection or a bonding surface which is provided on a lower surface of the abutment portion 32, and the mounting member 30 is attached through locking or bonding to the distal end of the pillar member 21 via the projection or the bonding surface.

The abutment portion 32 has formed thereon a circular abutment surface 33 which firmly sticks to the inner surface of the outer wall 10 of the fuel tank 1 and an elongated projection 34 having a triangular cross section which projects from the abutment surface 33 in such a manner as to penetrate into an interior of the outer wall 10 of the fuel tank 1. In a form shown in FIG. 3, a plurality of elongated projections 34 are formed in an arc fashion in parallel with each other. Because of this, the abutment surface 33 is prevented from becoming output of position in any direction thereof, and hence, the abutment surface 33 can strongly be fusion bonded to the outer wall 10 of the fuel tank 1 in every direction.

Next, a fabrication apparatus of the automotive fuel tank 1 of the invention and a fabrication method for fabricating the fuel tank 1 through blow molding by the use of the fabrication apparatus will be described below based on FIGS. 4 to 10.

Firstly, as is shown in FIG. 4, a fabrication apparatus of the automotive fuel tank 1 is made up of a blow mold 40 and a built-in part holding unit 50.

The blow mold 40 is divided into two mold parts by a parting line and the mold parts so divided are made to slide to open horizontally by a blow mold shifting device (not shown). In an interior of the blow mold 40, cavities 41 are formed for forming or molding the fuel tank 1. Furthermore, slidable press pins 42 are provided in each of the left and right blow mold parts 40.

In the built-in part holding unit 50, two holding rods for holding the built-in part 20, that is, the first holding rod 51 and the second holding rod 52 are provided, and also a holding rod sliding mechanism 53 is provided for sliding the first holding rod 51 and the second holding rod 52 vertically. Since the two holding rods, that is, the first holding rod 51 and the second holding rod 52 are provided, there is caused no such situation that the built-in part 20 is caused to shift in a rotational direction relative to the holding rods and hence can be positioned in the rotational direction and the horizontal direction with respect to the cavities 41 in an ensured fashion.

A first step 54 and a second step 55 are formed in that order from a lower end thereof on each of the first holding rod 51 and the second holding rod 52, and the first and second holding rods 51, 52 are each formed in such a manner that a diameter thereof is reduced step by step at portions where the first step 54 and the second step 55 are formed. The first holding rod 51 and the second holding rod 52 are inserted into the insertion holes 27 which are formed in the side surfaces of the box-shaped objects 25 of the built-in part 20 shown in FIG. 3.

Because of this, the insertion holes 27 of the box-shaped objects 25 which lie on the near side of FIG. 3 are locked by the first steps 54, and the insertion holes 27 in the box-shaped objects 25 which lie on the far side of FIG. 3 are locked by the second steps 55, whereby the connected box-shaped objects 25 are held by the holding rods. Because of this, a plurality of portions of the built-in part 20 can be locked and hence held by the plurality of steps of the respective holding rods in an ensured fashion, whereby the respective portions of a soft built-in part 20 or a large built-in part 20 can be held in predetermined positions in the interior of the fuel tank in an ensured fashion.

Also in the event that the first holding rod and the second holding rod 52 are formed in such a manner as to be gradually tapered instead of being formed to have the steps, by the diameters of the insertion holes 27 being formed to match the diameters of corresponding portions of the holding rods, the built-in part 20 can be held in the predetermined position by the holding rods.

In this way, although the first holding rod 51 and the second holding rod 52 are formed to each have the circular cross section in this embodiment, the holding rods can be formed to each have an oval cross section. Since the holding rods are formed to each have the circular or oval cross section, the positioning of the holding rods to the insertion holes 27 in the built-in part 20, which will be described later, is facilitated, whereby the insertion of the first holding rod 51 and the second holding rod 52 into the corresponding insertion holes 27 formed in the built-in part 20 is facilitated.

Firstly, the built-in part 20 is made to be held by the first holding rod 51 and the second holding rod 52. Thereafter, when the blow mold 40 is opened, the first holding rod 51 and the second holding rod 52 are caused to slide upwards by the holding rod sliding mechanism 53, so that the built-in part 40 can be located in their positions in the cavities 41 in the blow mold 40.

The first holding rod 51 and the second holding rod 52 are made to retreat from the blow mold 40 after the built-in part 20 is positioned within an interior of a parison 8 as a result of the blow mold parts 40 being closed and the parison 8 is held by the blow mold parts 40. After the built-in part 20 is mounted within the interior of the parison 8 which is held by the blow mold parts 40, an opening of the parison 8 can be closed in an ensured fashion as will be described later.

Next, based on FIGS. 5 to 10, a fabrication method will be described which employs the fabrication equipment of the fuel tank 1 of the invention.

Figure 5:
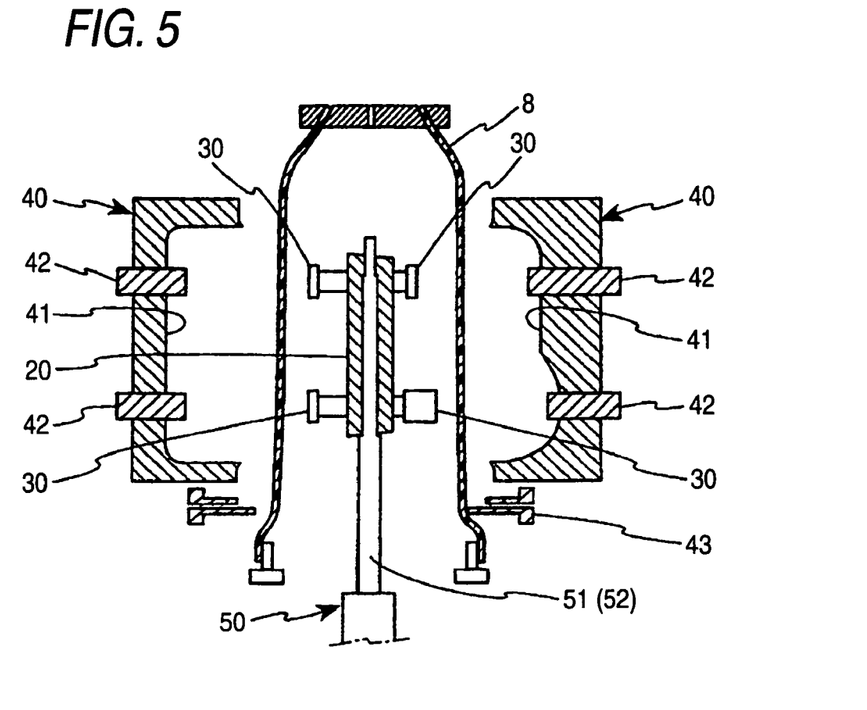
FIG. 5 is a sectional view showing a state in which a blow mold of the fabrication apparatus of the fuel tank of the invention is opened.

Firstly, as is shown in FIG. 5, the blow mold parts 40 are opened, and the built-in part 20 is made to be held by the first holding rod 51 and the second holding rod 52 in the way described above. Then, the built-in part 20 so held is positioned at a portion where the built-in part 20 confronts the cavities 41 in an interior space produced as a result of the blow mold parts 40 being opened. Then, the parison 8 is lowered, so that the built-in part 20 is then positioned within the interior of the parison 8.

Figure 6:
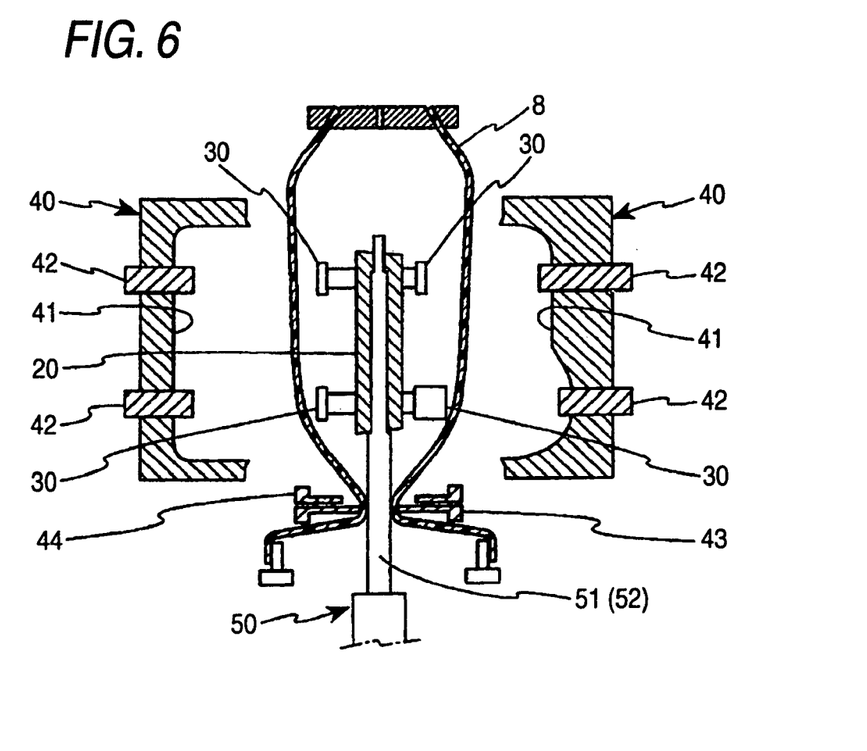
FIG. 6 is a sectional view showing a state in which the blow mold of the fabrication apparatus of the fuel tank of the invention is opened and a distal end of a parison is closed.

Thereafter, as is shown in FIG. 6, with the blow mold parts 40 left opened, first pinching plates 43 which are attached below the blow mold parts 40 are made to slide towards each other to hold a distal end portion of the parison 8 together with the first holding rod 51 and the second holding rod 52 therebetween.

Figure 7:
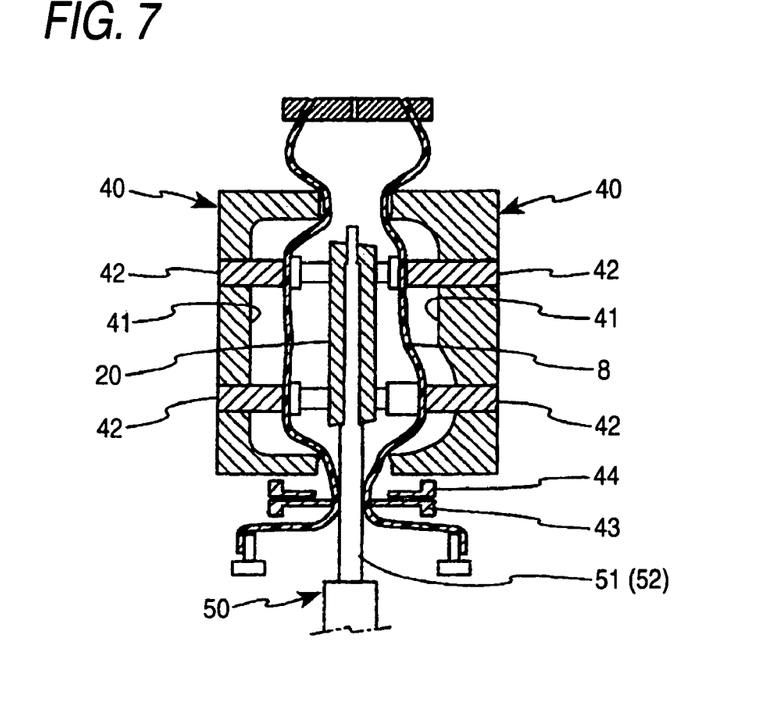
FIG. 7 is a sectional view showing the fuel tank fabrication apparatus of the invention in which press pins of the blow mold are caused to slide.

Then, as is shown in FIG. 7, the blow mold parts 40 are closed slightly, and the plurality of press pins 42 provided on the blow mold parts 40 are caused to slide. As this occurs, since the plurality of press pins 42 are provided in positions where they confront the mounting members 30, the parison 8 can be pressed against in such a manner as to be held by the mounting members 30 mounted on the built-in part 20 and the press pins 42.

Then, since an inner surface of the parison 8 still remains in a molten state, as has been described above, the elongated projections 34 of the abutment portions 32 of the mounting members 30 penetrate into the inner surface of the parison 8, whereby the abutment portions 32 and the parison 8 can be brought into fusion bonding with each other. As this occurs, since the built-in part 20 is held by the first holding rod 51 and the second holding rod 52, the mounting members 30 and the built-in part 20 can be attached to predetermined positions on the inner surface of the outer wall 10 of the fuel tank 1 in an ensured fashion.

Figure 8:
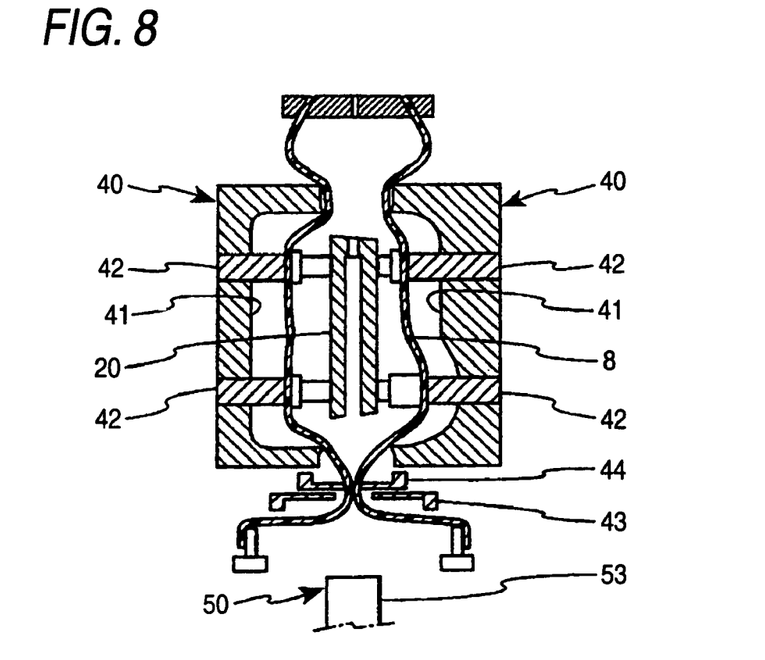
FIG. 8 is a sectional view showing the fuel tank fabrication apparatus of the invention in which the press pins of the blow mold are caused to slide and holding rods are removed from the blow mold.

Thereafter, as is shown in FIG. 8, with the built-in part 20 left held by the press pins 42, the first holding rod 51 and the second holding rod 52 are lowered by the holding rod sliding mechanism 53 so as to be removed from the blow mold 40, and second pinching plates 44 are caused to slide to close the parison 8. By this action, a hole can be closed which was produced at a distal end portion of the parison 8 by the first holding rod 51 and the second holding rod 52.

Figure 9:
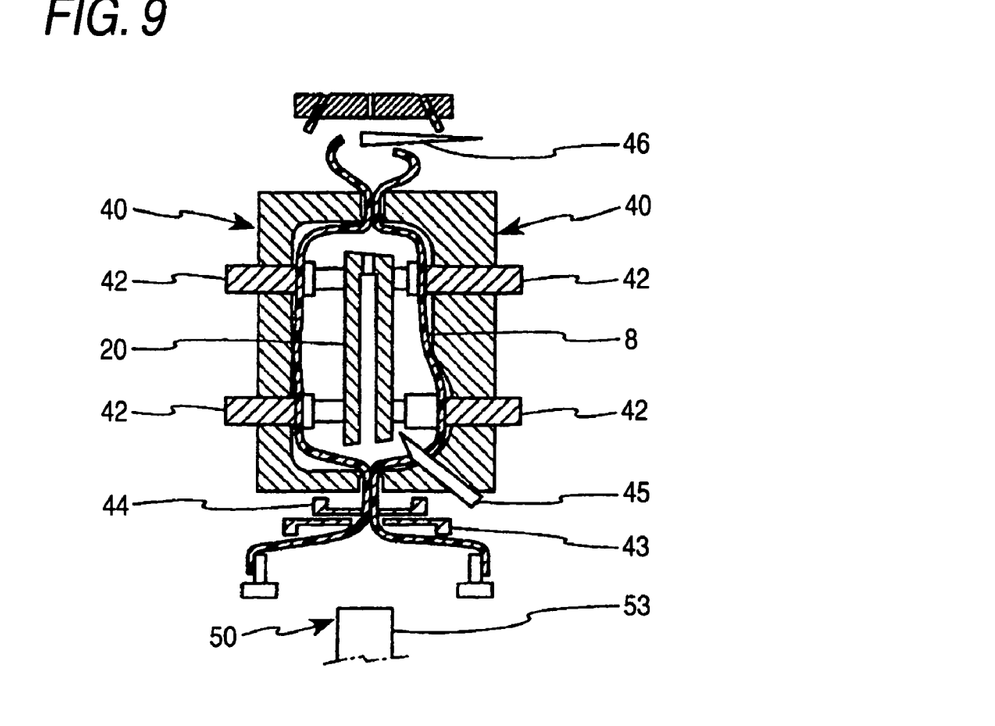
FIG. 9 is a sectional view showing the fuel tank fabrication apparatus of the invention in which the blow mold is slightly closed and air is blown into an interior of the parison.

Furthermore, as is shown in FIG. 9, the blow mold parts 40 are closed further, and the parison 8 is cut by a sliding cutter 46. As this occurs, the blow mode parts 40 have not yet been closed completely but still remain open slightly. When the blow mold parts 40 are closed, the press pins 42 remain pressing against the parison 8 and the built-in part 20, whereby the built-in part 20 can continue to be held in the predetermined position.

Then, air is blown into the interior of the parison 8 from an air nozzle, so as to press an outer surface of the parison 8 against the blow mold parts 40, whereby the fuel tank 1 is roughly shaped.

Figure 10:
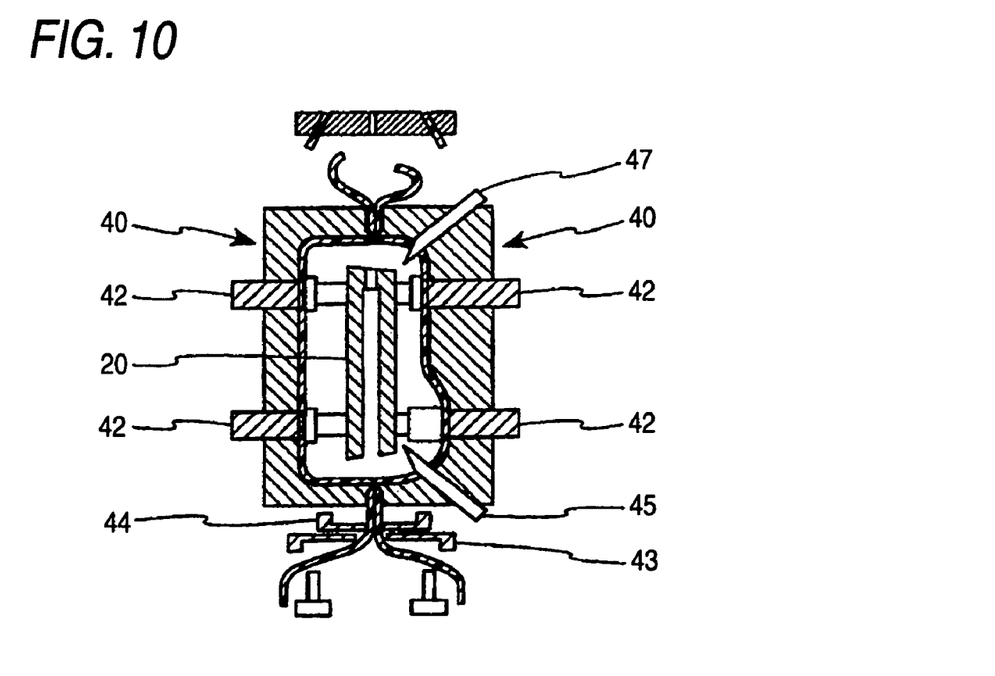
FIG. 10 is a sectional view showing the fuel tank fabrication apparatus of the invention in which the blow mold is closed completely.

Thereafter, as is shown in FIG. 10, the blow mold parts 40 are closed further until they are closed completely, whereby a front end and a rear end of the parison 8 can be closed completely by the blow mold parts 40. As this occurs, distal end faces of the press pin 42 and inner surfaces of the cavities of the blow mold parts 40 can lie on the same plane. In addition, air is blown further into the interior of the parison 8 from the air nozzle 45, so as to press the outer surface of the parison 8 against the blow mold parts 40 to form a complete shape of the fuel tank 1. Then, air is blown into the interior of the parison 8, while the air so blown into the parison 8 is removed therefrom through an air vent port 47, so that air is circulated in the interior of the parison 8, and the blow molding is then completed. Thereafter, the blow mold parts 40 are opened to release the fuel tank 1 so molded therefrom.

The parison 8 which is used in the fabrication apparatus of the automotive fuel tank 1 of the invention employs a parison made up of six layers. A parison having a layer constitution made up of six or more layers can be used. In addition, as will be described later, the skin layer 11 is used when a reground material or a filler is mixed into the exterior main layer 12, but the skin layer 11 can be omitted.

The skin layer 11 and the exterior main layer 12 are formed from a thermoplastic synthetic resin which has a large impact resistance and whose rigidity is maintained against the fuel oil and are preferably formed from a high-density polyethylene (HDPE). When the exterior main layer 12 contains an inorganic filler, the skin layer 11 is used to cover the surface of the exterior main layer 12, so as to eliminate a situation in which the inorganic filler so contained is exposed from the surface of the exterior main layer 12, whereby the surface of the parison 8 can be made smooth.

As a high-density polyethylene (HDPE) used for the skin layer 11, the exterior main layer 12 and the interior main layer 16, which will be described later, for example, the following polyethylenes can be used.

High-density polyethylenes can be used whose melt rates of flow (MRF: 21.6 kg/10 min) are in the range of 5 to 7 and densities are in the range of 0.944 to 0.950.

The exterior main layer 12 may be formed using as a main material a reground material which mainly contains a high-density polyethylene (HDPE). Used as reground materials which contain mainly high-density polyethylenes (HDPE) are, for example, a reground material which results by regrinding fuel tanks 1 which were salvaged after use and a reground material which results by regrinding cut pieces and detectives which are produced during the fabrication process of fuel tanks 1. Since the fuel tank 1 is made up mainly of the high-density polyethylene (HDPE), reground materials from fuel tanks 1 contain mainly the high-density polyethylene.

These reground materials are used 100% on some occasions, while a fresh high-density polyethylene (HDPE) is mixed into the reground materials for use on other occasions.

The barrier layer 14 is formed from a thermoplastic synthetic resin which has extremely low fuel oil permeability. As thermoplastic synthetic resins used to make up the barrier layer 14, although the following can be used which include, for example, ethylene-vinyl alcohol copolymer (EVOH), polybutylene terephthalate, polyethylene terephthalate, polyphenylene sulfide (PPS), liquid crystal polymer (LCP), and semi-aromatic nylon (PPA), ethylene-vinyl alcohol copolymer (EVOH) is preferable.

Since the fuel tank 1 has the barrier layer 14, the permeation of fuel oil such as gasoline which has penetrated through the interior main layer 16, which will be described later, can be prevented by the barrier layer 14, thereby making it possible to prevent the evaporation of fuel oil into the atmosphere.

When the ethylene-vinyl alcohol copolymer (EVOH) is used as the barrier layer 14, it becomes possible to provide superior gasoline impermeability and superior workability through good fusion moldability. In addition, the barrier layer 14 has the superior gasoline impermeability even under a high humidity condition. Furthermore, the barrier lay 14 has the superior impermeability against a gasoline containing alcohol.

The exterior adhesive layer 13 is provided between the exterior main layer 12 and the barrier layer 14, so as to bond together these two layers, and the interior adhesive layer 15 is provided between the interior main layer 16 and the barrier layer 14, so as to bond together these two layers. The exterior adhesive layer 13 and the interior adhesive layer 15 are formed from the same material and are formed from a synthetic resin which has adhesion to both the high-density polyethylene (HDPE) and the barrier layer 14. Because of this, the barrier layer 14, the exterior main layer 12 and the interior main layer 16 can be bonded strongly together by the exterior adhesive layer 13 and the interior adhesive layer 15 so that those layers can be tightly and integrally bonded together, whereby the fuel impermeability and strength of the fuel tank 1 can be ensured.

As adhesive thermoplastic synthetic resins for use for the exterior adhesive layer 13 and the interior adhesive layer 15, for example, modified polyolefin resins can be used. Unsaturated carboxylic acid modified polyolefin is preferred, and unsaturated carboxylic acid modified polyethylene is particularly preferred. This synthetic resin can be produced by copolymerization or graft polymerization of unsaturated carboxylic acid into polyolefin resin.

As has been described above with respect to the skin layer 11, the same material as that used for the skin layer 11 is used for the interior main layer 16, and hence, the interior main layer 16 is formed from the high-density polyethylene (HDPE).

The interior main layer 16 has a thickness which occupies 15% to 67% of the overall thickness of the outer wall 10 of the fuel tank 1. Since the overall thickness of the outer wall 10 is in the range of 3 mm to 8 mm, the thickness of the interior main layer 16 is in the range of 0.45 mm to 5.36 mm. By this configuration, since the interior main layer 16 has the sufficient thickness, the outer wall 10 of the fuel tank 1 can continue to hold its rigidity and ensure its impact resistance, even in the event that the outer wall 10 is swollen by fuel contained in the fuel tank 1.

What is claimed is:

1. An automotive fuel tank fabrication apparatus for forming through blow molding an automotive fuel tank having a built-in part mounted in an interior thereof and an outer wall formed from a thermoplastic synthetic resin, the automotive fuel tank fabrication apparatus comprising:
    a blow mold for molding an outer wall of the automotive fuel tank; and
    a built-in part holding unit for holding the built-in part at an opening and closing portion of the blow mold so as to mount the built-in part within the automotive fuel tank, wherein
    the blow mold has two molds that can be opened and closed, and cavities are formed on opening and closing sides of the molds for molding the automotive fuel tank, so as to hold a parison therebetween to mold an outer wall of the automotive fuel tank, wherein
    the built-in part holding unit includes a plurality of holding rods for holding the built-in part, the holding rods being made to freely advance and retreat so as to hold the built-in part in a position where the built-in part confronts the cavities on the opening and closing sides of the blow mold when the blow mold is opened, to position the built-in part in an interior of the parison when the blow mold is closed and to retreat from the blow mold after the parison is held, the holding rods being formed in such a manner as to reduce their diameters as they extend towards distal ends thereof and adapted to be inserted into insertion holes formed in the built-in part so as to hold the built-in part, and wherein
    the holding rods pass through the built-in part and the holding rods each have formed thereon a plurality of steps in such a manner that their diameters are gradually reduced as they extend towards the distal ends thereof, so as to lock the built-in part by the steps so formed.

2. An automotive fuel tank fabrication apparatus as set forth in claim 1, wherein
    the holding rods each have a circular or oval cross section.

3. An automotive fuel tank fabrication apparatus as set forth in claim 1, wherein
    the blow mold has formed thereon a slidable press pin for pressing a distal end portion of the built-in part from an outside of the parison for holding the built-in part.

4. An automotive fuel tank fabricating method using the automotive fuel tank fabrication apparatus as set forth in claim 1, wherein
    the parison which makes up the outer wall of the fuel tank is made up of five layers including an exterior main layer, an exterior adhesive layer, a barrier layer, an interior adhesive layer and an interior main layer in that order from the outside, the exterior main layer and the interior main layer being formed from a high-density polyethylene, the barrier layer being formed from an ethylene-vinyl alcohol copolymer, the exterior adhesive layer and the interior adhesive layer being formed from a synthetic resin having adhesion to both the high-density polyethylene and the barrier layer, and the parison is blow molded.

* * * * *